W. V. TURNER.
ELECTROPNEUMATIC BRAKE.
APPLICATION FILED OCT. 3, 1914.
1,214,616.
Patented Feb. 6, 1917.
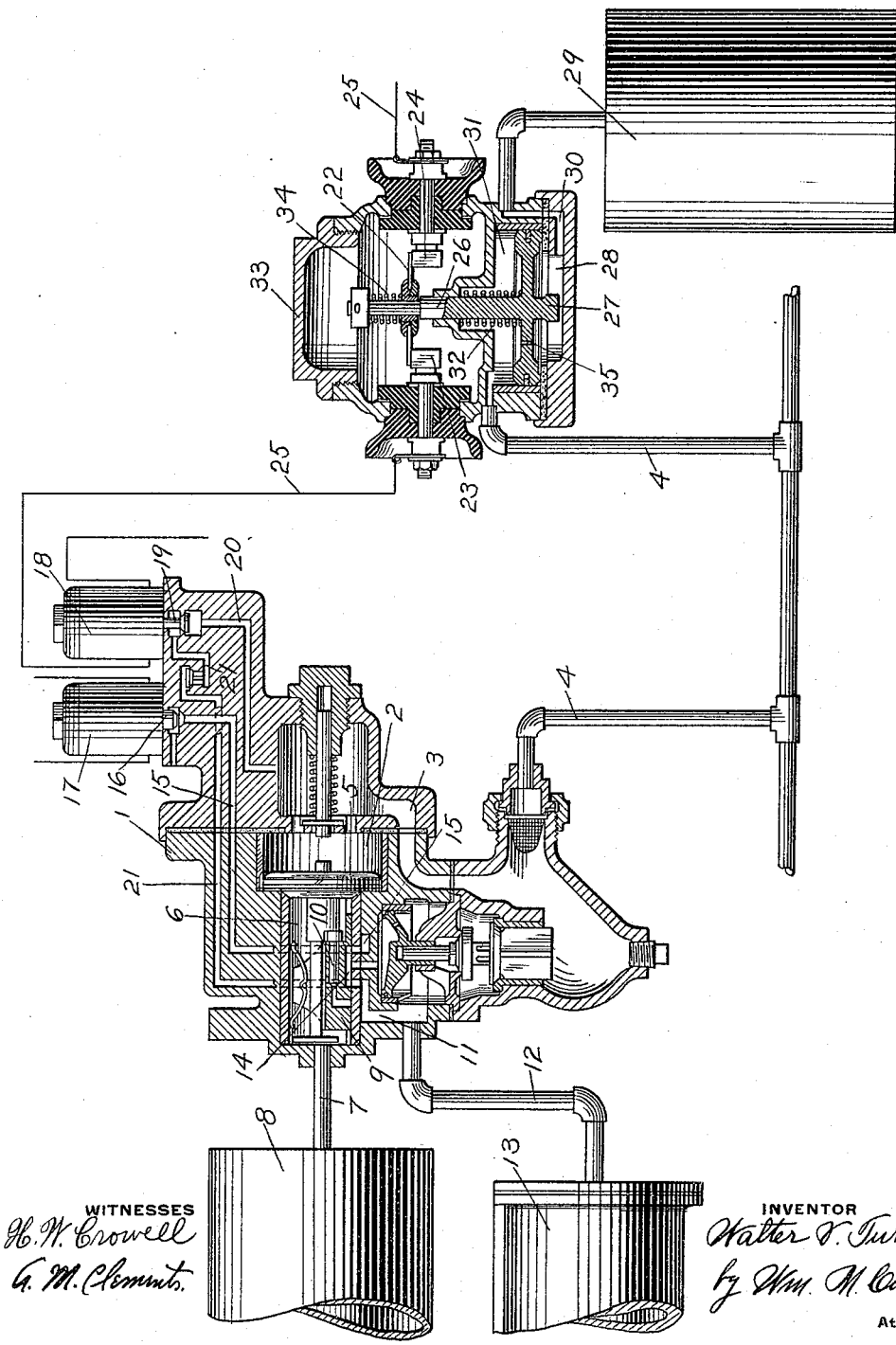

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,214,616.  Specification of Letters Patent.  Patented Feb. 6, 1917.

Application filed October 3, 1914. Serial No. 864,874.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brakes, of which the following is a specification.

This invention relates to electro-pneumatic brakes, and more particularly to an equipment in which the brakes are applied by electrically venting fluid from the brake pipe.

The principal object of my invention is to provide means for limiting the rate of reduction in brake pipe pressure which can be made by the electrically controlled means.

In the accompanying drawing, the single figure is a diagrammatic view partly in section, of an electro-pneumatic brake equipment for a car, with my improvement applied thereto.

As shown in the drawing, the brake equipment may comprise an equalizing or triple valve device 1, having the usual piston chamber 2 connected by passage 3 to brake pipe 4 and containing piston 5 and having valve chamber 6 connected by pipe 7 to auxiliary reservoir 8 and containing main valve 9 and graduating valve 10 adapted to be actuated by piston 5.

The main valve seat is provided with the usual brake cylinder port 11 connected by pipe 12 to brake cylinder 13 and the slide valve 9 is provided with cavity 14 for connecting brake cylinder port 11 with exhaust port 15 in release position.

The brake cylinder exhaust port 15 may be controlled by a release valve 16 adapted to be actuated by magnet 17 and in order to electrically apply the brakes an application magnet 18 may be provided for operating a valve 19 which controls the venting of fluid from the brake pipe 4 through passages 20 and 21 to the brake cylinder.

According to my invention, the circuit of the magnet 18 is controlled by a switch 22, contained in casing 33 and adapted to bridge contacts 23 and 24 in the circuit wire 25. The switch 22 is carried by the stem 26 of a piston 27 having a chamber 28 at one side preferably connected to a reservoir 29 by passage 30, and having chamber 31 at the opposite side connected to brake pipe 4. When the fluid pressures on opposite sides of the piston 27 are substantially equalized, a spring 32 yieldingly maintains the piston seated toward the chamber 28, with the switch 22 in closed position.

In order to insure the seating of switch 22 when piston 27 is seated, the switch may be slidably mounted on the stem 26, a spring 34 being adapted to act on the switch, so as to yieldingly maintain connection at the contacts 23 and 24, in case it is necessary for the piston 27 to move relatively to the switch in order to seat.

In operation, the brake pipe 4 is normally charged with fluid under pressure, and fluid flows from the brake pipe to chamber 31 of the switch casing 33 and thence through a small equalizing port 35 to chamber 28, also charging the reservoir 29 through passage 30. The opposing fluid pressures on piston 27 being equalized, the spring 32 maintains the parts with switch 22 closed. If it is desired to apply the brakes electrically, current is supplied to the circuit wire 25, so that the magnet 18 on each car of the train is energized. The valve 19 is then actuated by the magnet 18 to open communication for venting fluid from the brake pipe through passages 20 and 21 to the brake cylinder. The reduction in brake pipe pressure thus effected causes movement of the triple valves to service application position and a brake application is then produced in the usual manner. If the rate of reduction in brake pipe pressure does not exceed the desired degree, then the equalizing port 35 is of sufficient size to maintain equalization of fluid pressures on the piston 27 by back flow from the reservoir 29 to the brake pipe. If, however, the rate of reduction should exceed the capacity of the port 35, by reason of excessive brake pipe leakage or otherwise, then the higher fluid pressure existing in chamber 28 will operate the piston 27 to open the switch 22. The application magnets 18 are thereupon deënergized and the valves 19 are closed, so that further venting of fluid from the brake pipe is prevented. If the rate of reduction in brake pipe pressure now becomes reduced so as to permit the fluid pressures on the piston 27 to equalize, the switch 22 will again close, and should the operator still have the brake valve in application position, the magnets 18 will be again energized to effect a further venting of fluid from the brake pipe, but the operation of the switch 22 will again prevent the rate of reduction from exceeding the predetermined maximum, so that undesired movement of the triple valves to emergency position will be prevented.

Having now described my invention, what I claim as new and desire to secure by Letters Patent, is:—

1. In an electro-pneumatic brake, the combination with an electrically controlled valve for venting fluid from the brake pipe to effect an application of the brakes, of a switch device normally closing the electric circuit of said valve during an application of the brakes and adapted to open said circuit upon the rate of reduction in brake pipe pressure exceeding a predetermined degree.

2. In an electro-pneumatic brake, the combination with a brake pipe and an equalizing valve device operated by a reduction in brake pipe pressure for effecting an application of the brakes, of a magnet valve device for venting fluid from the brake pipe and a switch device adapted under a reduction in brake pipe pressure in effecting an application of the brakes for maintaining the circuit of the magnet closed and operated when the rate of reduction in brake pipe pressure exceeds a predetermined maximum to open the magnet circuit.

3. In an electro-pneumatic brake, the combination with a brake pipe, of an electrically controlled valve for venting fluid from the brake pipe to effect an application of the brakes, a switch in the control circuit of said valve and a piston normally holding said switch closed during an application of the brakes and operated by fluid under pressure when the rate of brake pipe reduction exceeds a predetermined limit for actuating said switch to open the control circuit.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."